United States Patent [19]
von Pragenau

[11] 3,866,863
[45] Feb. 18, 1975

[54] SPACE VEHICLE

[75] Inventor: George L. von Pragenau, Huntsville, Ala.

[73] Assignee: The United States of America as represented by the Administration of the National Aeronautics and Space Administration, Washington, D.C.

[22] Filed: Mar. 21, 1974

[21] Appl. No.: 453,232

[52] U.S. Cl. .............................................. 244/162
[51] Int. Cl. ........................................... B64c 39/02
[58] Field of Search ........... 244/160, 162, 2, 1 R, 3; 102/49.4

[56] References Cited
UNITED STATES PATENTS

| | | | |
|---|---|---|---|
| 3,232,560 | 2/1966 | Moise et al. | 244/162 |
| 3,702,688 | 11/1972 | Faget | 244/2 X |

FOREIGN PATENTS OR APPLICATIONS

| | | | |
|---|---|---|---|
| 1,060,093 | 2/1967 | Great Britain | 244/162 |

OTHER PUBLICATIONS

"Reusable One-Stage-To-Orbit Shuttles; Brightening Prospects" by R. Salkeld & R. Beichel; Astronautics & Aeronautics, June 1973, pp. 48-58.

Primary Examiner—Trygve M. Blix
Assistant Examiner—Paul E. Sauberer
Attorney, Agent, or Firm—Wayland H. Riggins; L. D. Wofford, Jr.; John R. Manning

[57] ABSTRACT

A space vehicle having an improved ascent configuration for use in traveling in space including a winged orbiter having an elongated fuselage and rearwardly directed main engines fixed to the fuselage, and an elongated tank assembly of an improved configuration disposed forwardly of the fuselage and connected with the main engines of the vehicle for supplying thereto liquid propellants, and a booster stage comprising a pair of integrated solid rocket boosters connected with the orbiter immediately beneath the fuselage and extended in substantial parallelism therewith.

6 Claims, 7 Drawing Figures

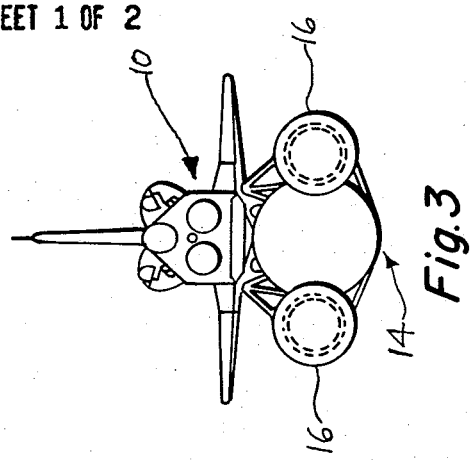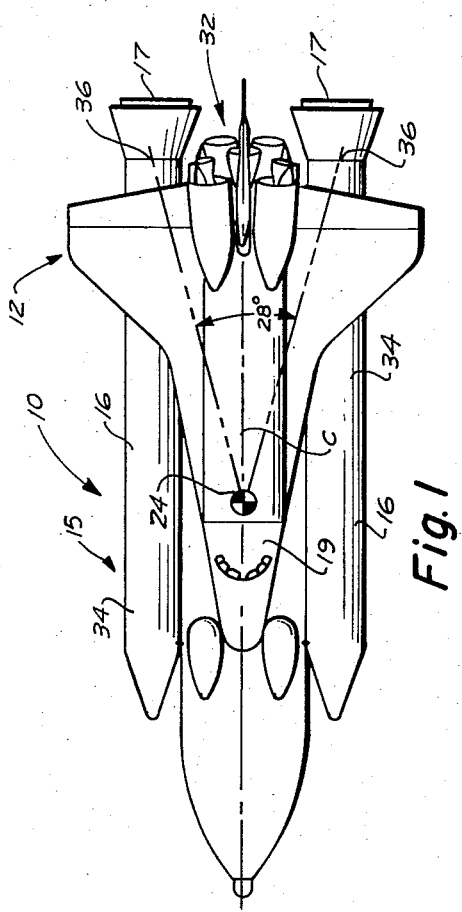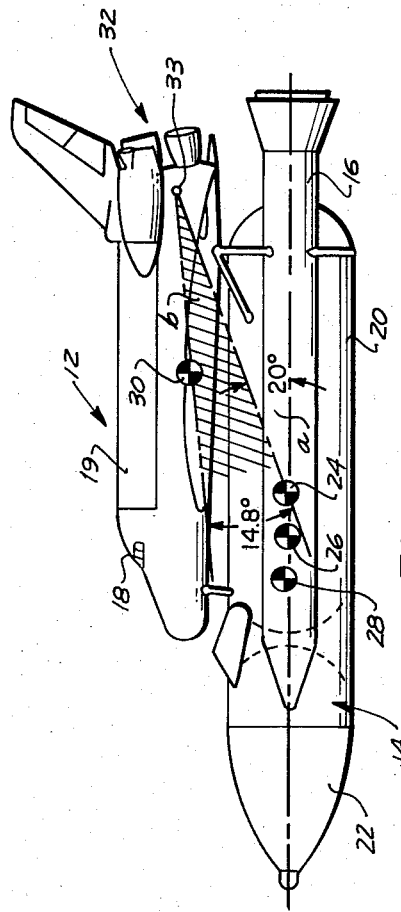

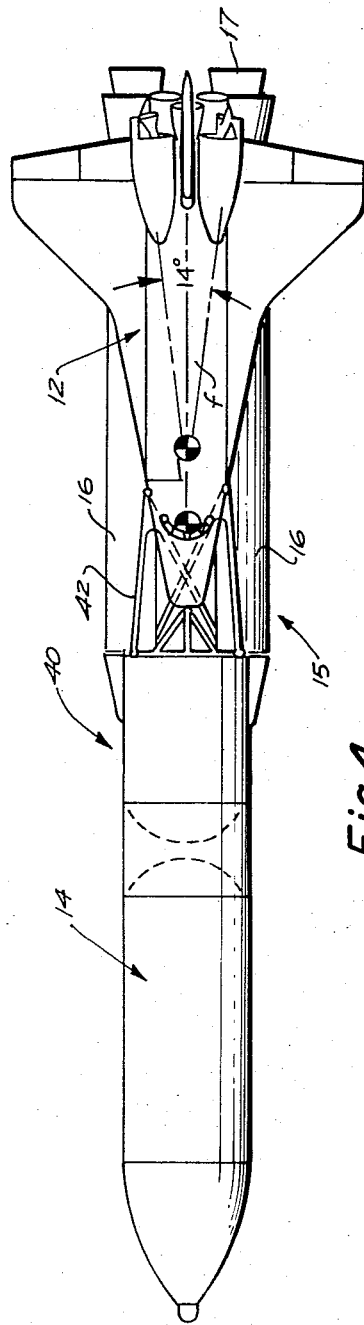
Fig.4
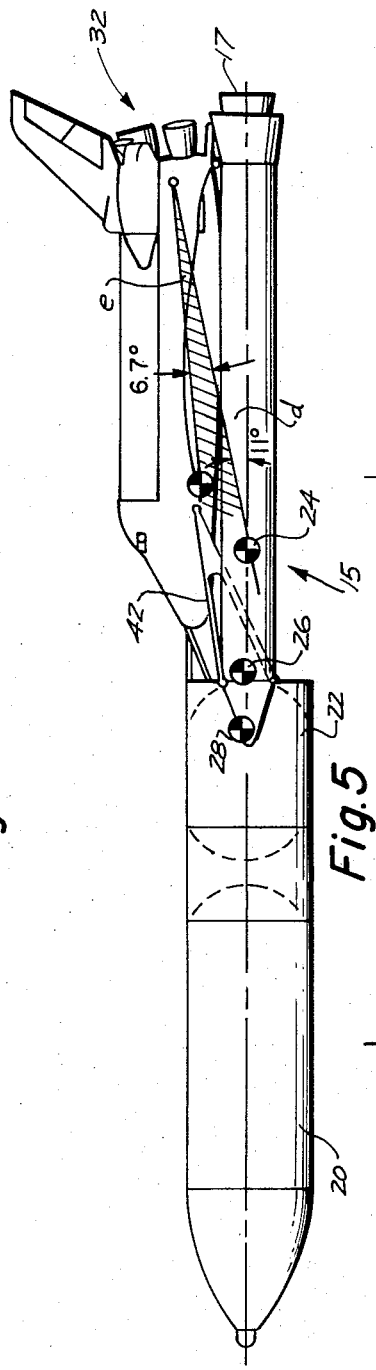
Fig.5
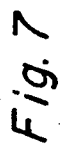
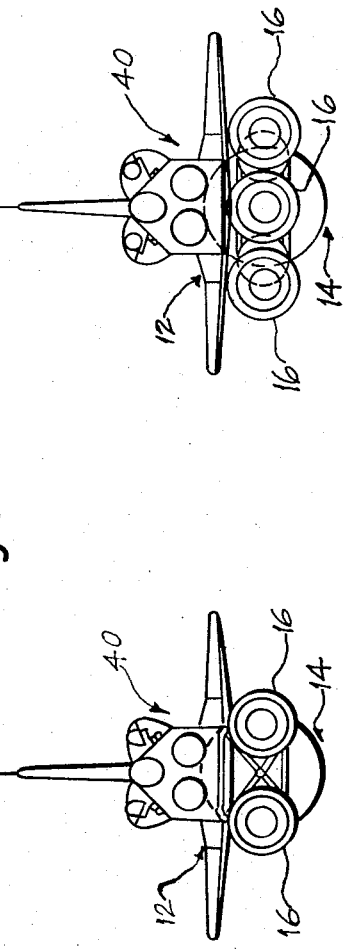
Fig.6 Fig.7

SPACE VEHICLE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The instant invention relates to transportation systems for use in traveling in space and more particularly to a space vehicle having an improved ascent configuration.

Various vehicles and launching systems have been proposed for injecting a spacecraft, frequently referred to as an orbiter, into an orbit about the earth beyond the earth's atmosphere.

Recently, attention has been given to the design and fabrication of a vehicle equipped with a reuseable orbiter which may be injected into orbit and thereafter returned to the surface of the earth in a manner similar to that of a conventional aircraft. Such a system is described in U.S. Pat. No. 3,702,688 to Maxime A. Faget and assigned to the United States of America as represented by the Administrator of the National Aeronautics and Space Administration.

Initially, a fully reuseable space transportation system was sought but was found to be expensive and require that a bulky orbiter and even bulkier fly-back booster be provided. The booster size was reduced first by considering high-density propellants and second by replacing the wing version of the booster with a parachute recovery system. Thermal problems also were of concern and led to lower staging velocity. The orbiter size was reduced by relaxing the reuseability requirement which resulted in an expendable external tank being provided for the orbiter. Thus, the configuration of the vehicle was narrowed down to a version which included a four body cluster where the orbiter and a booster stage including two solid rocket motors were attached to a large external tank which serves to supply liquid propellants to the main engines for the vehicle located aboard the orbiter.

The external tank represents 40 to 86 percent of the total vehicle weight, depending upon flight time, and has the largest volume of all of the bodies of the cluster. Unfortunately, the size and weight of the external tank introduced problems of a serious nature, which must be dealt with. The problems are, of course, related to the effects of complicated flow patterns, interference heating, thermal protection limits, noise, performance loss, indirect force flow, mass eccentricities, abort requirements, destabilization propulsion effects, dynamic complexity and ascent control.

It is therefore the general purpose of the instant invention to provide in a transporation system for use in traveling in space beyond the earth's atmosphere, a space vehicle having an improved ascent configuration which overcomes the aforementioned disadvantages, without sacrificing the various advantages of the vehicles heretofore employed.

OBJECTS AND SUMMARY OF THE INVENTION

It is, therefore, an object of the instant invention to provide a space vehicle having an improved ascent configuration through which vehicle performance and growth potential are increased and costs are reduced.

Another object is to provide an improved vehicle including a four body cluster, wherein an orbiter and two solid rocket boosters are attached to a large external tank positioned in a more centered location forwardly of the solid rocket booster and orbiter.

It is another object to provide an improved vehicle for use in space beyond the earth's atmosphere wherein all propulsion units are more closely spaced, static moments due to eccentricities are avoided, control and structural links are shortened, force flow straightened, drag strongly reduced, major shock impingement forces eliminated, interference heating reduced and the weight of the external tank and the solid rocket boosters lowered.

These and other objects and advantages are achieved through an improved vehicle which includes a winged orbiter having an elongated fuselage and rearwardly directed main engines fixed to the fuselage, an elongated tank assembly disposed forwardly of the fuselage and connected with the rocket engines for supplying liquid propellants thereto, and a booster stage, including a pair of integrated solid rocket boosters disposed beneath the fuselage and extended in substantial parallelism therewith. Connecting links are provided for releasably connecting the tank assembly and the booster stage with the orbiter in a manner such that the external tank is in a more centered position, than it enjoys in prior art vehicles, as will hereinafter become more readily apparent by reference to the following description and claims in light of the accompanying drawings.

BRIEF DESCRIPTION OF THE DRAWINGS

FIG. 1 is a top plan view of a vehicle for use in traveling in space, as found in the prior art.

FIG. 2 is a side elevation of the vehicle shown in FIG. 1.

FIG. 3 is a rear end elevation of the system shown in FIGS. 1 and 2.

FIG. 4 is a top plan view of a vehicle having an improved ascent configuration which embodies the principles of the instant invention.

FIG. 5 is a side elevational view of the system shown in FIG. 4.

FIG. 6 is an end elevational view of the system shown in FIG. 5.

FIG. 7 is an end elevational view of a system similar to FIGS. 4 and 5 with a third solid rocket booster inserted between the pair of solid rocket boosters of FIGS. 4 and 5.

DESCRIPTION OF THE PREFERRED EMBODIMENT

Referring now to the drawings wherein like reference characters designate like or corresponding parts throughout the several views, there is shown in FIGS. 1, 2 and 3, a space vehicle 10 adapted to be launched and injected into orbit above the earth's atmosphere. The vehicle 10 is shown in order to exemplify the vehicles of the prior art.

As shown in FIGS. 1, 2 and 3, the vehicle 10, at launch, includes an orbiter 12, an external tank 14 and a booster stage 15 comprising a pair of solid rocket boosters 16. Each of the boosters 16 includes a solid rocket motor 17. The orbiter 12 includes a suitable thrust frame, not designated, and a crew compartment 18 located in the forward portion of a fuselage 19.

Within the compartment there is provided suitable life-support systems, not shown. The external tank 14 includes a liquid hydrogen tank 20 suspended immediately beneath the orbiter 12 while a liquid oxygen tank 22 is positioned immediately forward of the orbiter in coaxial alignment with the liquid hydrogen tank.

Since the orbiter 12, the liquid hydrogen tank 20, and the boosters 16 are known, a detailed description of these components is omitted in the interest of brevity. It is important to note that the external tank 14 represents 40 to 86 percent of the total vehicle weight, depending on flight time. Moreover, the external tank constitutes the largest volume of all major bodies. Therefore, ascent configuration of the vehicle 10 lacks concentricity.

As depicted in FIGS. 1, 2 and 3 of the drawings, due to the ascent configuration of the vehicle 10, the mass center for the vehicle at lift-off, or at launch, is located at a point designated 24, while the center of mass at burn-out for the solid rocket boosters 16 is located at a point designated 26 and the center of mass at staging, or the point in time at which separation of the booster stage 15 occurs is located at a point designated 28. Finally, the center of mass for the vehicle at the time of burn-out for the external tank 14 is designated 30.

The orbiter 12 further includes within the fuselage 19 a cluster of main engines, designated 32, the thrust center of which is designated at 33. Each of the boosters 16, of the booster stage 15, includes a body 34, which serves to supply solid propellants to the attached motor 17, the thrust center of which is designated 36.

The eccentricity of the ascent configuration for the vehicles of prior art can be illustrated clearly through the use of imaginary lines extended through the center of mass for the vehicle, at different points in time for the life of the vehicle. For example, an included angle defined by a line passing through the thrust center 33 for the main engines 32 and the mass center at lift-off, designated 24, and a center line for the vehicle 10 passing through the center of mass, designated angle $a$, is an angle of 20°.

Similarly, an imaginary line passing through the center of the mass of the vehicle 10 and the center of thrust 33 when the vehicle 10 is in its ascent configuration and a line passing through the center of thrust 33 and the center of the mass at the time of external tank burn-out 30 is 14.8°. Similarly, a pair of lines passing through the center of thrust 36 for the booster motors 17 and the center of mass 24 defines an included angle $c$ of 28°.

The orbiter 12, the external tank 14 and boosters 16 are interconnected through a series of struts, not designated, equipped with suitable devices including explosive bolts, adapted to accommodate selective separation at predetermined intervals following lift-off.

Turning now to FIGS. 4 through 6, therein is illustrated a space vehicle 40 having an improved ascent configuration which embodies the principles of the instant invention. The vehicle 40 also comprises a winged orbiter 12, an external tank 14 and booster stage 15 including a pair of boosters 16 of substantially the same configuration and size as those which collectively make up the space vehicle 10, as illustrated in FIGS. 1, 2 and 3. However, it is here noted that the external tank 14 has been shifted from an eccentric position relative to the orbiter 12 to a more centered position and forwardly of the solid rocket booster stage 15 and the orbiter 12. Moreover, all of the propulsion units of the vehicle 40 are more closely spaced.

Each of the boosters 16, of the booster stage 15, is provided with suitable attach points, not shown, for attaching the booster stage to the external tank 14, as well as to the orbiter 12. The external tank 14, as shown in FIGS. 4 and 5, is so configured that the liquid hydrogen tank 20 is positioned forwardly of the liquid oxygen tank 22, in coaxial alignment therewith, while the liquid oxygen tank remains in approximately the position shown in FIGS. 1, 2 and 3. Of course, longer feed lines are required for delivering the liquid hydrogen to the main engines 32 of the orbiter 12, however, tank pressures can now be reduced substantially from the tank pressure required in the configuration illustrated in FIGS. 1, 2 and 3, for reasons fully understood by those familiar with such vehicles.

The thrust of the solid rocket booster stage 15 is received by the liquid oxygen tank 22 without loading the liquid hydrogen tank, as occurs in the vehicle 10, as illustrated in FIGS. 1, 2 and 3. The direct application of the thrust forces to the liquid oxygen, in conjunction with reduced tank pressures, facilitate a reduction in weight and cost for the external tank 14. Moreover, thermal protection needs are relaxed since the forward portion of the external tank 14 is free from impinging shock waves emitted from the orbiter 12 or the solid rocket booster stage 15, as occurs when employing the vehicle, shown in FIGS. 1, 2 and 3.

The ascent configuration of the vehicle 40, illustrated in FIGS. 4, 5 and 6, further affords good forward visibility so that separation of the external tank 14 may be visually observed. As a practical matter, suitable attach points for shortened links 42, which extend between the orbiter 12 and the external tank 14 are provided for coupling the orbiter and the external tank 14, while suitable connecting links, not shown, are provided for coupling the booster stage 15 with the orbiter and the external tank 14. These links also include selectively operable devices, such as explosive bolts, through which selective separation is facilitated.

It will be appreciated, from even a cursory review of the drawings, that the points of the center of mass for the vehicle 40, also designated 24 through 30, are advanced forwardly with respect to the orbiter 12.

As illustrated in FIG. 5, angle $d$ which corresponds to angle $a$, as shown in FIG. 2, constitutes an angle of 11° due to the fact that the external tank 14 has been moved forwardly to accommodate a mounting of the orbiter 12 immediately above the booster stage 15. Thus, it can be appreciated that the thrust center 33, of the main engines 32, has been moved closer to the mass center of the vehicle. For similar reasons, an angle, designated $e$, which corresponds to angle $b$ as shown in FIG. 2, between a pair of straight lines extended from the thrust center 33 through the center of mass at lift-off and the center of mass at external tank burn-out is an angle of 6.7°. Moreover, as illustrated in FIG. 4, the included angle, designated $f$, which corresponds to angle $c$, shown in FIG. 1, is an angle of 14°.

In operation, the solid rocket booster stage 15 is separated, by releasing links to the external tank and to the orbiter and firing several thrusters, not shown. The latter are, however, positioned at each end of each solid rocket booster and canted in directions so that the plumes do no impinge upon the orbiter. The external tank 14 is separated, at an appropriate time, through the release of the external tank links, designated 42, and by firing reaction control system thrusters for the orbiter 12, not designated. Additional thrusters are provided where so desired.

The aerodynamic benefits achieved through the ascent configuration of the vehicle 40, of the instant invention, can be appreciated by comparing FIGS. 1 through 3 and FIGS. 4 through 6. It is noted that the cross section of the vehicle 10, as shown in FIGS. 1 through 3, is substantially greater than the cross section of the vehicle 40 shown in FIGS. 4 through 6. This, of course, tends to lower maximum drag. The reduction in cross section constitutes an improvement in the average combined specific impulse. The base drag, which is affected by engine plume in uncertain ways, is now practically eliminated. Moreover, the center of aerodynamic lift forces has been shifted significantly forward by the external tank 14 of vehicle 40. A direct effect of this is an improved balancing of lift forces from the orbiter wings, such that aerodynamic rotation efforts will be reduced.

An assembly of the vehicle 40 is performed without threading the external tank 14, as is required when stacking of the vehicle 10, shown in FIGS. 1, 2 and 3. First, the two solid rocket boosters 16 are set and held to the launch pad; secondly, the external tank 14 is lowered onto the solid rocket boosters 16 and connected to the solid rocket boosters; and finally, the orbiter 12 is lowered, by attach points provided at the leading wing roots. After connecting the nose of the orbiter 12 to the external tank, the orbiter 12 next is linked with the solid rocket boosters 16 at points near the thrust area of the solid rocket boosters. Then the hoisting equipment is removed, freeing the leading wing root points which are then connected to the external tank links.

Ground wind effects are stronger for the vehicle 40 having an ascent configuration, as shown in FIGS. 4 through 6, but damping devices provided between the forward external tank 14 and the launch tower can be employed in a manner well understood by those familiar with techniques employed in controlling ground wind effects for space vehicles. In flight, wind gusts tend to cause large bending moments which are absorbed by the external tank interstage attached directly to the solid rocket boosters 16. Ascent wing loads for the orbiter 12 of the vehicle 40, are considerably reduced due to the lack of interference from the solid rocket boosters 16 which are now closer to the wing roots. Also interference flutter from the boosters 16 of the vehicle 40 is less likely to occur than in the vehicle 10.

The complexity of the flow patterns for the space vehicle 40 is greatly reduced, when compared to that of the space vehicle 10, as are the effects of impingement, noise, fatigue and interference heating. The latter two items represent not only technology risks but also influence strongly refurbishment expenses. Interference heating, which occurs for the vehicle 10, amplifies normal heating and produces temperatures requiring thermal protection for the external tank. The ascent configuration of the space vehicle 40 eliminates the possibility of flow impingement onto the external tank, therefore, provision for thermal protection is reduced or substantially eliminated.

Shock wave impingement for the space vehicle 40 is substantially less for the vehicle 40 than for the space vehicle 10. For example, the external tank shock wave for the vehicle 40 impinges at substantially higher Mach numbers. Shock waves generated behind the external tank will impinge at lower Mach numbers but will be weakened by shrouding in the proximity of the solid rocket motors 17. Reduced shock wave impingement reduces noise and also the fatigue risk associated with the steep pressure gradient of such waves.

The configuration of the space vehicle 40 approximates symmetry to a considerable degree so that dynamic coupling is reduced especially in yaw and roll which interferes with the stabilization of the ascent control for the space vehicle 10. The reduced eccentricity of the external tank 14 decreases the pitch-longitudinal coupling and the interaction between the pitch attitude control and propulsion system stabilization. The proximity of the propulsion units for the space vehicle 40 yields rigid links between all control systems thus simplifying the dynamic interface for ascent control by reducing the number of motion sensors. The shorter mechanical links, for the vehicle 40, also tend to shift the solid rocket booster-orbiter cluster resonances to higher frequencies, thus causing fewer control stabilization problems. The elongated body of the space vehicle 40 also introduces few bending resonances below the frequency range for the bending resonances for the space vehicle 10. Additionally, the elongated body increases the moment of inertia which results in a lower control frequency, separated from the lower bending modes. The lower control frequencies relax the control response speed requirement.

Mission flexibility of vehicle 40 is illustrated in FIG. 7 where a third solid rocket booster 16 is inserted to add propulsive energy with relatively modest structural changes.

Although the invention has been herein shown and described in what is conceived to be the most practical and preferred embodiment, it is recognized that departures may be made therefrom within the scope of the invention, which is not to be limited to the illustrative details disclosed.

I claim:

1. A space vehicle having an improved ascent configuration adapted to be launched from the earth's surface comprising:
    A. an orbiter having re-entry capabilities including an elongated fuselage and a rearwardly directed liquid rocket engine fixed to said fuselage;
    B. an external tank of an elongated configuration disposed forwardly of said fuselage and connected with said rocket engine for supplying thereto liquid propellants;
    C. an expendable booster stage for propelling said vehicle including a pair of solid rocket boosters disposed beneath said fuselage and extended in substantial parallelism therewith; and
    D. connecting means for releasably connecting said external tank and said booster stage with said orbiter.

2. The system of claim 1 wherein said external tank includes a hydrogen tank for confining hydrogen in a liquefied state and an oxygen tank for confining oxygen in a liquefied state, said oxygen tank being disposed between said orbiter and said hydrogen tank.

3. The system of claim 2 wherein the included angle defined by a line extended through the thrust center of the liquid engine and the mass center for the system at lift-off and the longitudinal axis of symmetry for said system is an angle of less than 20°.

4. The system of claim 2 wherein the included angle defined by a line extended through the thrust center of the liquid engine and the mass center of the system at lift-off, and a line extended through the thrust center of the liquid engine and the mass center at external tank burn-out is less than 14°.

5. The system of claim 2 wherein the mass center for said system at booster burn-out lies in a plane passing transversely through the longitudinal axis of symmetry for said system forwardly of said orbiter.

6. The system of claim 2 wherein a pair of lines passing through the center of thrust for said booster and the mass center of said system at lift-off defines an included angle of less than 28°.

* * * * *